US012717776B2

(12) United States Patent
Kim et al.

(10) Patent No.: US 12,717,776 B2
(45) Date of Patent: Aug. 25, 2026

(54) METHOD AND SYSTEM FOR SELECTING INFORMATION PROVIDER FOR USER QUERY

(71) Applicant: NAVER Corporation, Seongnam-si (KR)

(72) Inventors: Min Kyeam Kim, Seongnam-si (KR); Jae Min Ahn, Seongnam-si (KR); Seok Won Park, Seongnam-si (KR); Sungeun Kim, Seongnam-si (KR); SunYoung Ha, Seongnam-si (KR); Jisu Seo, Seongnam-si (KR); Jaeman Park, Seongnam-si (KR); SaeRom Park, Seongnam-si (KR); Jinseok Lim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 18/813,497

(22) Filed: Aug. 23, 2024

(65) Prior Publication Data

US 2025/0068623 A1 Feb. 27, 2025

(30) Foreign Application Priority Data

Aug. 23, 2023 (KR) ........................ 10-2023-0110858
Jan. 10, 2024 (KR) ........................ 10-2024-0004216

(51) Int. Cl.
*G06F 16/00* (2019.01)
*G06F 16/242* (2019.01)

(52) U.S. Cl.
CPC .................................. *G06F 16/242* (2019.01)

(58) Field of Classification Search
CPC .................................................. G06F 16/3344
See application file for complete search history.

(56) References Cited

U.S. PATENT DOCUMENTS

2023/0244678 A1 8/2023 Hill
2024/0046318 A1* 2/2024 Muriqi ................. G06Q 20/389

FOREIGN PATENT DOCUMENTS

CN 110088747 A 8/2019
CN 116595150 A 8/2023
JP 2002-175469 A 6/2002
JP 2014-533405 A 12/2014
JP 2017-528836 A 9/2017
JP 2019-200598 A 11/2019

(Continued)

OTHER PUBLICATIONS

Office Action issued by the Japanese Patent Office in corresponding JP Patent Application No. 2024-139369, issued Sep. 2, 2025.

(Continued)

*Primary Examiner* — Ajith Jacob
(74) *Attorney, Agent, or Firm* — Greer Burns & Crain Ltd.

(57) ABSTRACT

A method and system for selecting an information provider to a user query. An information provider selection method may include verifying LLM results created based on a large language model (LLM) from a prompt of a user; and reflecting correlation between content of each of a plurality of information providers and the LLM results and then selecting from among the plurality of information providers, at least one information provider to provide an instance of content for the prompt of the user.

17 Claims, 14 Drawing Sheets

(56) References Cited

FOREIGN PATENT DOCUMENTS

| | | | | |
|---|---|---|---|---|
| KR | 10-2551531 | | 7/2023 | |
| TW | 202119235 | A | 5/2021 | |
| WO | WO-2024264056 | A1 * | 12/2024 | ........... G06F 16/953 |

OTHER PUBLICATIONS

Office action issued in corresponding Taiwanese patent application No. 113131762, dated May 28, 2025.

* cited by examiner

Figure 5:
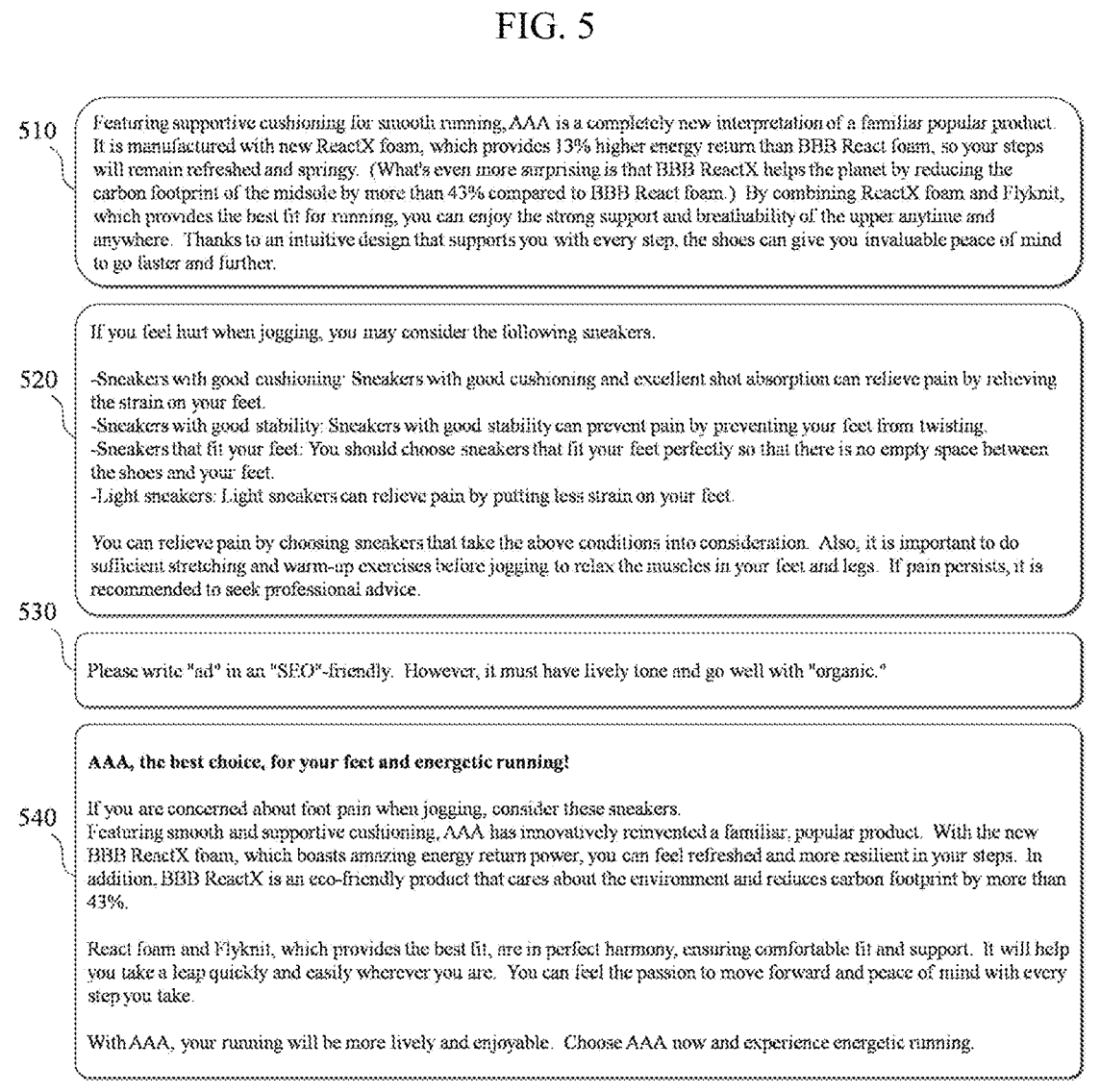

Featuring supportive cushioning for smooth running, AAA is a completely new interpretation of a familiar popular product. It is manufactured with new ReactX foam, which provides 13% higher energy return than BBB React foam, so your steps will remain refreshed and springy. (What's even more surprising is that BBB ReactX helps the planet by reducing the carbon footprint of the midsole by more than 43% compared to BBB React foam.) By combining ReactX foam and Flyknit, which provides the best fit for running, you can enjoy the strong support and breathability of the upper anytime and anywhere. Thanks to an intuitive design that supports you with every step, the shoes can give you invaluable peace of mind to go faster and further.

520

If you feel hurt when jogging, you may consider the following sneakers.

-Sneakers with good cushioning: Sneakers with good cushioning and excellent shot absorption can relieve pain by relieving the strain on your feet.
-Sneakers with good stability: Sneakers with good stability can prevent pain by preventing your feet from twisting.
-Sneakers that fit your feet: You should choose sneakers that fit your feet perfectly so that there is no empty space between the shoes and your feet.
-Light sneakers: Light sneakers can relieve pain by putting less strain on your feet.

You can relieve pain by choosing sneakers that take the above conditions into consideration. Also, it is important to do sufficient stretching and warm-up exercises before jogging to relax the muscles in your feet and legs. If pain persists, it is recommended to seek professional advice.

530

Please write "ad" in an "SEO"-friendly. However, it must have lively tone and go well with "organic."

540

AAA, the best choice, for your feet and energetic running!

If you are concerned about foot pain when jogging, consider these sneakers.
Featuring smooth and supportive cushioning, AAA has innovatively reinvented a familiar, popular product. With the new BBB ReactX foam, which boasts amazing energy return power, you can feel refreshed and more resilient in your steps. In addition, BBB ReactX is an eco-friendly product that cares about the environment and reduces carbon footprint by more than 43%.

React foam and Flyknit, which provides the best fit, are in perfect harmony, ensuring comfortable fit and support. It will help you take a leap quickly and easily wherever you are. You can feel the passion to move forward and peace of mind with every step you take.

With AAA, your running will be more lively and enjoyable. Choose AAA now and experience energetic running.

Figure 7:
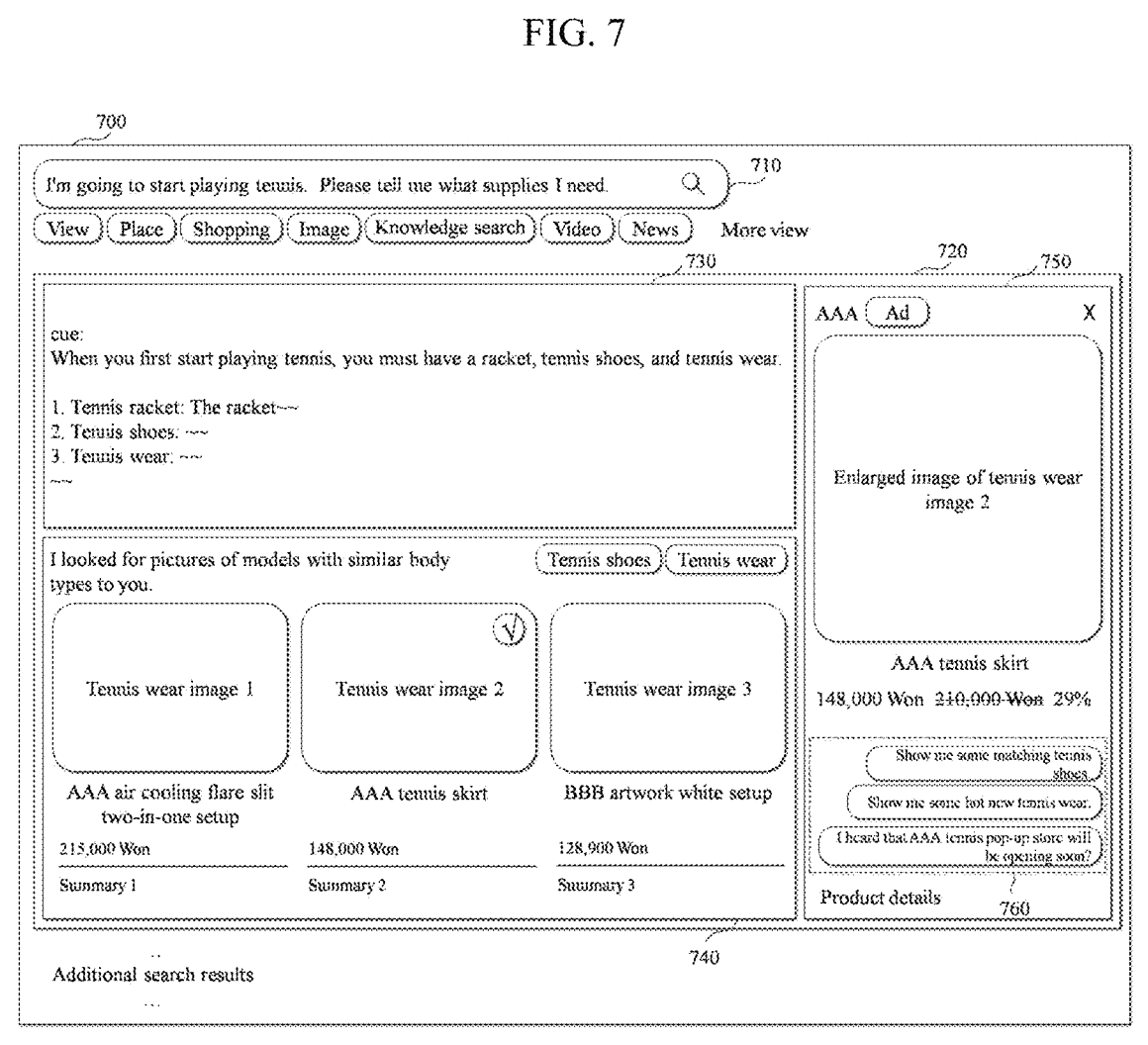

I'm going to start playing tennis. Please tell me what supplies I need.

710

View
Place
Shopping
Image
Knowledge search
Video
News
More view 730
720
750 cue:
When you first start playing tennis, you must have a racket, tennis shoes, and tennis wear.

1. Tennis racket: The racket~~
2. Tennis shoes: ~~
3. Tennis wear: ~~
~~

I looked for pictures of models with similar body types to you.
Tennis shoes
Tennis wear Tennis wear image 1
AAA air cooling flare slit two-in-one setup
215,000 Won
Summary 1

Tennis wear image 2
AAA tennis skirt
148,000 Won
Summary 2

Tennis wear image 3
BBB artwork white setup
128,900 Won
Summary 3

AAA
Ad
X

Enlarged image of tennis wear image 2

AAA tennis skirt
148,000 Won ~~210,000 Won~~ 29%

Show me some matching tennis shoes.
Show me some hot new tennis wear.
I heard that AAA tennis pop-up store will be opening soon?

Product details
760

740

...
Additional search results
...

Figure 9:
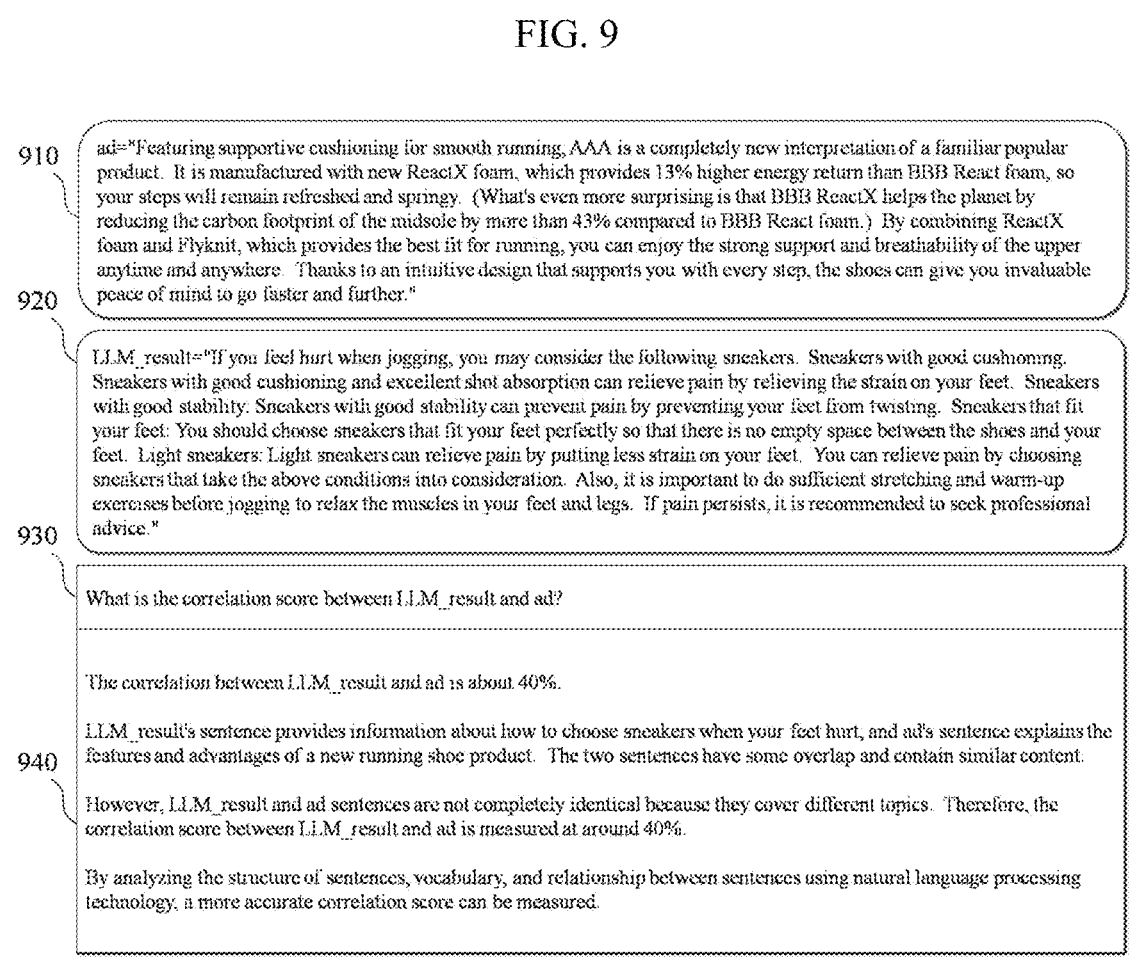

910
ad="Featuring supportive cushioning for smooth running, AAA is a completely new interpretation of a familiar popular product. It is manufactured with new ReactX foam, which provides 13% higher energy return than BBB React foam, so your steps will remain refreshed and springy. (What's even more surprising is that BBB ReactX helps the planet by reducing the carbon footprint of the midsole by more than 43% compared to BBB React foam.) By combining ReactX foam and Flyknit, which provides the best fit for running, you can enjoy the strong support and breathability of the upper anytime and anywhere. Thanks to an intuitive design that supports you with every step, the shoes can give you invaluable peace of mind to go faster and further."

920
LLM_result="If you feel hurt when jogging, you may consider the following sneakers. Sneakers with good cushioning. Sneakers with good cushioning and excellent shot absorption can relieve pain by relieving the strain on your feet. Sneakers with good stability: Sneakers with good stability can prevent pain by preventing your feet from twisting. Sneakers that fit your feet: You should choose sneakers that fit your feet perfectly so that there is no empty space between the shoes and your feet. Light sneakers: Light sneakers can relieve pain by putting less strain on your feet. You can relieve pain by choosing sneakers that take the above conditions into consideration. Also, it is important to do sufficient stretching and warm-up exercises before jogging to relax the muscles in your feet and legs. If pain persists, it is recommended to seek professional advice."

930
What is the correlation score between LLM_result and ad?

940
The correlation between LLM_result and ad is about 40%.

LLM_result's sentence provides information about how to choose sneakers when your feet hurt, and ad's sentence explains the features and advantages of a new running shoe product. The two sentences have some overlap and contain similar content.

However, LLM_result and ad sentences are not completely identical because they cover different topics. Therefore, the correlation score between LLM_result and ad is measured at around 40%.

By analyzing the structure of sentences, vocabulary, and relationship between sentences using natural language processing technology, a more accurate correlation score can be measured.

METHOD AND SYSTEM FOR SELECTING INFORMATION PROVIDER FOR USER QUERY

CROSS-REFERENCE TO RELATED APPLICATION(S)

This U.S. non-provisional application claims the benefit of priority under 35 U.S.C. § 119 to Korean Patent Application No. 10-2023-0110858 filed on Aug. 23, 2023, and Korean Patent Application No. 10-2024-0004216 filed on Jan. 10, 2024, in the Korean Intellectual Property Office (KIPO), the entire contents of both of which are incorporated herein by reference.

BACKGROUND OF THE INVENTION

One or more example embodiments of the present invention in the following description relate to a method and system for selecting an information provider to a user query.

Large language models (LLM) are a type of artificial intelligence trained with a large corpus of text data to create a human-like response to a natural language input and also a language model with an artificial neural network containing numerous parameters (usually billions of weights or more). LLMs may be trained with a significant amount of unlabeled text using self-supervised learning or semi-self-supervised learning.

Reference material includes Korean Patent Registration No. 10-2551531.

BRIEF SUMMARY OF THE INVENTION

One or more example embodiments of the present invention provide a method and system for selecting an information provider to a user query.

According to at least one example embodiment of the present invention, there is provided an information provider selection method of a computer device including at least one processor, the information provider selection method including verifying, by the at least one processor, LLM results created based on a large language model (LLM) for a prompt of a user; and reflecting, by the at least one processor, correlation between content of each of a plurality of information providers and the LLM results and selecting from among the plurality of information providers, at least one information provider to provide an instance of content for the prompt of the user.

According to an aspect of the present invention, the selecting of the at least one information provider may include primarily selecting, from among the plurality of information providers, information providers related to at least one of the prompt of the user, the LLM results, and a recommendation query created by the large language model; and dynamically conducting an auction between the primarily selected information providers and selecting the at least one information provider as a final information provider.

According to another aspect of the invention, the selecting as the final information provider may include selecting the at least one information provider through a ranking determined based on a quality index (QI) and a bid amount (BA) of each of the information providers, and the quality index may be determined using at least correlation between content of each of the plurality of information providers and the LLM results.

According to still another aspect of the invention, the selecting of the at least one information provider may include selecting the at least one information provider by further reflecting correlation between content of each of the plurality of information providers and the prompt of the user.

According to still another aspect of the invention, the selecting of the at least one information provider may include selecting the at least one information provider by further reflecting correlation between at least one of the prompt of the user, the LLM results, and a recommendation query created by the LLM and an analysis dimension derived from an asset of each of the plurality of information providers.

According to still another aspect of the invention, the analysis dimension may include at least one of a content format, contents, a style, and a tone and manner.

According to still another aspect of the invention, the asset may include at least one of a uniform resource locator (URL) related to content that a corresponding information provider desires to provide, a title of the content, an identifier of the content, a category of the content, multimedia related to the content, contents of the content, and contents of an article related to the content.

According to still another aspect of the invention, an instance for content of the selected at least one information provider may be dynamically created using the LLM results and a pre-registered asset of the selected at least one information provider and provided to the user.

According to still another aspect of the invention, the instance for the content of the selected at least one information provider may be dynamically created by further using at least one of the prompt of the user, a pre-registered prompt of the selected at least one information provider, and information on the user.

According to still another aspect of the invention, the pre-registered prompt may include at least one of a phrase or a keyword entered by the selected at least one information provider to emphasize in relation to the content that the selected at least one information provider desires to provide and a tone or a format of an information message to be provided through the instance for the content.

According to at least one example embodiment of the present invention, there is provided a non-transitory computer-readable recording medium storing a computer program to execute the method on the computer device.

According to at least one example embodiment of the present invention, there is provided a computer device including at least one processor configured to execute instructions readable on the computer device, wherein the at least one processor is configured to verify LLM results created based on a large language model (LLM) for a prompt of a user, and to reflect correlation between content of each of a plurality of information providers and the LLM results and to select from among the plurality of information providers, at least one information provider to provide an instance of content for the prompt of the user.

According to some example embodiments of the present invention, it is possible to provide a method and system for selecting an information provider to a user query.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 1 is a diagram illustrating an example of a network environment according to at least one example embodiment of the present invention;

FIG. 5 illustrates an example of a dynamically produced advertising instance according to at least one example embodiment of the present invention;

FIG. 7 illustrates an example of providing search results according to at least one example embodiment of the present invention;

FIG. 8 illustrates an example of computing first correlation through an LLM according to at least one example embodiment of the present invention;

FIG. 9 illustrates an example of computing second correlation through an LLM according to at least one example embodiment of the invention.

Figure 2:
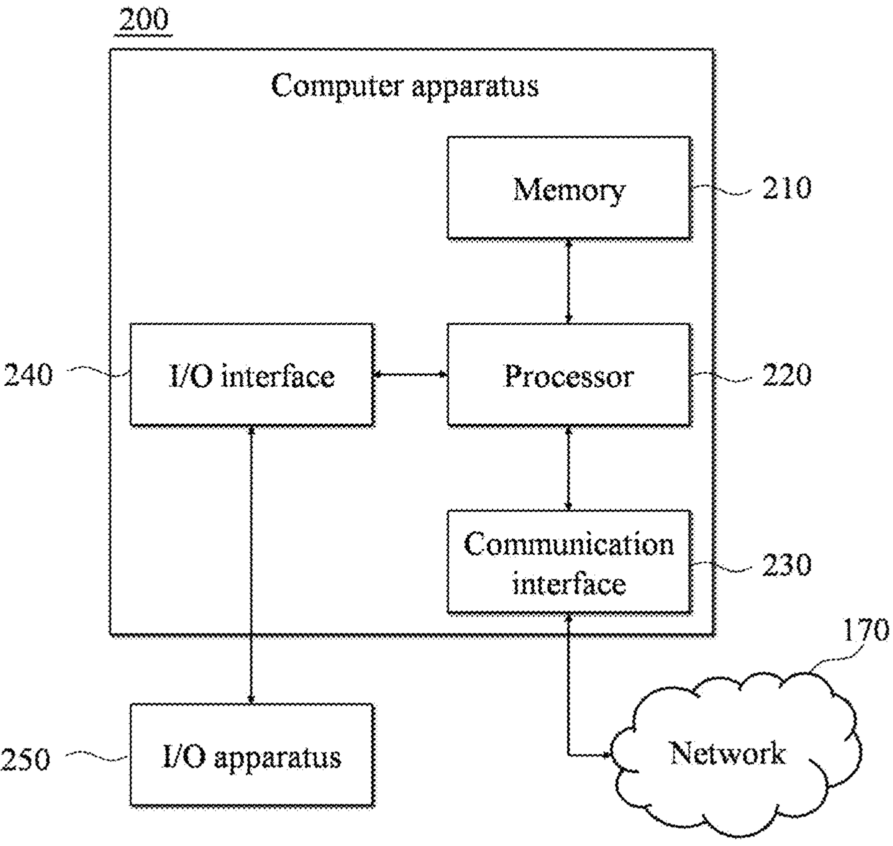
FIG. 2 is a block diagram illustrating an example of a computer device according to at least one example embodiment of the present invention.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

An information provider selection system according to the example embodiments may be implemented by at least one computer device. Here, a computer program according to an example embodiment may be installed and executed on the computer device that implements the information provider selection system, and the computer device may perform an information provider selection method according to the example embodiments under control of the executed computer program. The aforementioned computer program may be stored in a computer-readable storage medium to computer-implement the information provider selection method in conjunction with the computer device.

Figure 1:
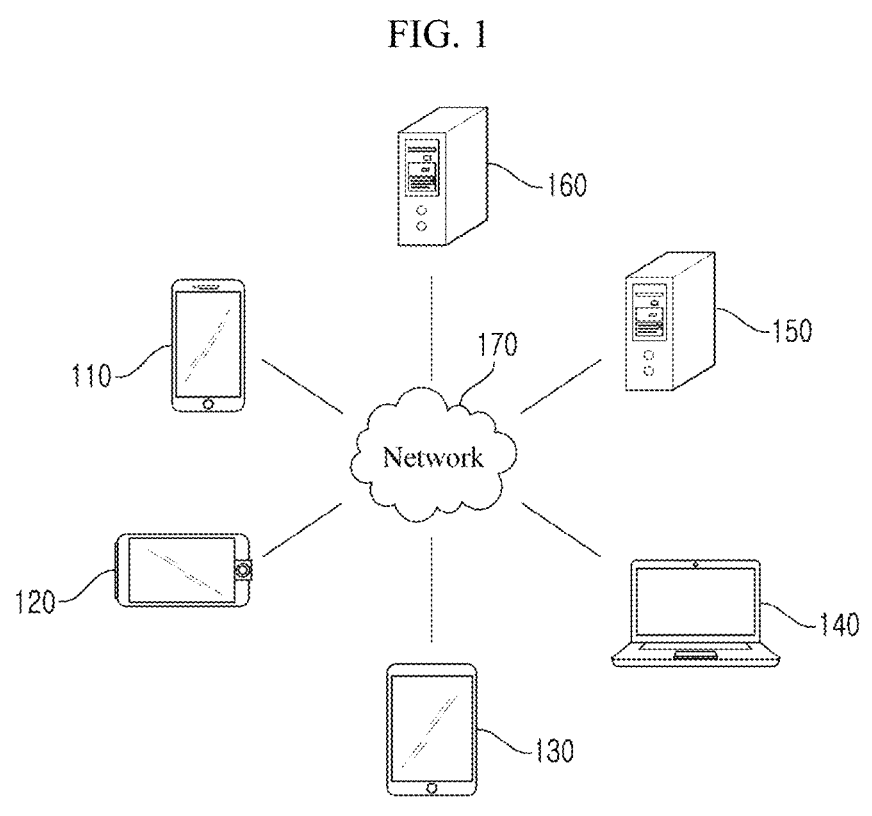

FIG. 1 illustrates an example of a network environment according to at least one example embodiment of the invention. Referring to FIG. 1, the network environment may include a plurality of electronic devices 110, 120, 130, and 140; a plurality of servers 150 and 160; and a network 170. FIG. 1 is provided as an example only. The number of electronic devices or the number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may each comprise a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, or the like. For example, although FIG. 1 illustrates a shape of a smartphone as an example of the electronic device 110, the electronic device 110 used herein may refer to any one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of a plurality of network topologies that include a personal area network (PAN), a local area network (LAN), a campus area network (CAN), a metropolitan area network (MAN), a wide area network (WAN), a broadband network (BBN), and the Internet. Also, the network 170 may include at least one of a plurality of network topologies that include a bus network, a star network, a ring network, a mesh network, a star-bus network, a tree or hierarchical network, and the like. However, these network topologies are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170, and the server 160 may also be a system that provides a second service to the plurality of electronic devices 110, 120, 130, and 140. As a detailed example, the server 150 may provide a service (e.g., a search service) targeted by a corresponding application to the plurality of electronic devices 110, 120, 130, and 140 as the first service through the application as the computer program installed and executed on the plurality of electronic devices 110, 120, 130, and 140. As another example, the server 160 may provide a service for distributing a file for installing and executing the aforementioned application to the plurality of electronic devices 110, 120, 130, and 140 as the second service.

FIG. 2 is a block diagram illustrating an example of a computer device according to at least one example embodiment. Each of the plurality of electronic devices 110, 120, 130, and 140 of FIG. 1 or each of the servers 150 and 160 may be implemented by a computer device or apparatus 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 200 as a permanent storage device separate from the memory 210. Also, an OS (operating system) and at least one program code may be stored in the memory 210. Such software components may be loaded to the memory 210 from another non-transitory computer-readable recording medium that is separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of through the non-transitory computer-readable recording medium. For example, the software components may be loaded to the memory 210 of the computer device 200 based on a computer program installed via files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as in the memory 210.

The communication interface 230 may provide a function for communication between the computer device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

According to other example embodiments, the computer device 200 may include a number of components that is greater than or less than the number of components shown in FIG. 2. However, there is no need to clearly illustrate many components according to the related art, as such components are known to those of ordinary skill in the art. For example, the computer device 200 may include at least a portion of the I/O device 250, or may further include other components, for example, a transceiver, a database, etc.

Figure 3:
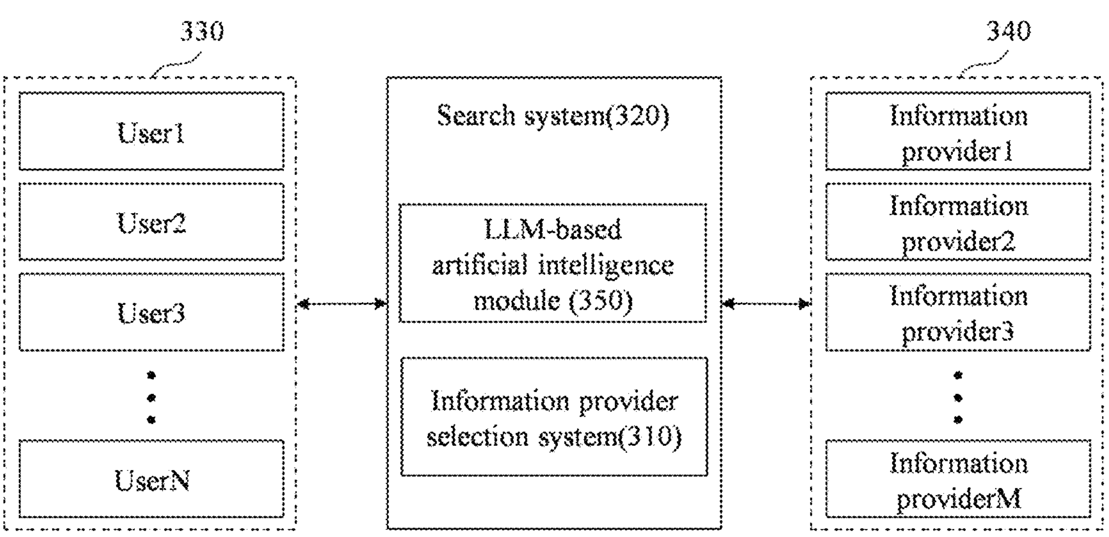
FIG. 3 is a block diagram illustrating an example of an information provider selection system according to at least one example embodiment of the present invention.

FIG. 3 illustrates an example of an information provider selection system according to at least one example embodiment. FIG. 3 illustrates an information provider selection system 310, a search system 320, a plurality of users 330, and a plurality of information providers 340.

The search system 320 may correspond to a server (e.g., server 150) that provides a search service to the plurality of users 330, and may be implemented as at least one computer device 200 (FIG. 2). Here, each of the plurality of users 330 may be a physical device of a user that connects to the search system 320 using the network 170 (FIG. 2) to receive the search service, and the physical device may be implemented as the aforementioned computer device 200 (FIG. 2).

The information provider selection system 310 according to the example embodiment may be included in the search system 320, or it may be implemented to interact with the search system 320 through the network 170. The example embodiment of FIG. 3 illustrates an example in which the information provider selection system 310 is included in the search system 320. In this case, the information provider selection system 310 may be implemented on at least one physical device to implement the search system 320. In certain example embodiments, the information provider selection system 310 may be implemented as a physical device that is separate from a physical device that implements the search system 320 and may also be implemented to communicate with the search system 320 through the network 170.

A search service provided by the search system 320 to the plurality of users 330 may include search results corresponding to the input of a user. Search results may be basically created based on information that may be searched on the web. Also, the search system 320 may include, in the search results, information that the plurality of information providers 340 desire to provide (instance for content of information provider) and that has been provided to the search service. Here, information provided from the plurality of information providers 340 may be advertising information, but it is not limited thereto. The basics of a search service that provides search results is already known and thus, a further description is omitted.

The search system 320 according to the example embodiment may provide the search service by including, in the search results, answers based on artificial intelligence (such as a large language model (LLM)). For example, the search system 320 may include an LLM-based artificial intelligence module 350 that performs various processing based on an LLM loaded into a memory of the search system 320 (for example, a memory 210 of a computer device 200 implementing the search system 320). The search system 320 may receive a natural language-based prompt from a specific user from among the plurality of users 330. In this case, the search system 320 may input the received prompt into the LLM, may create a first answer suitable for the prompt as LLM results, and may provide search results including the first answer to the user using the LLM-based artificial intelligence module 350. Here, the search results may include at least a portion of various search results in addition to the first answer. Also, the search system 320 may provide the search service through conversation between the LLM-based artificial intelligence module 350 and the user. The search service may be provided to the user while switching between a first mode of providing the first answer as LLM results through a general search service and a second mode of providing the first answer as LLM results through conversation between the LLM-based artificial intelligence module 35 and the user. Here, in the first mode, a user interface for switching to the second mode may be provided, and in the second mode, a user interface for switching to the first mode may be provided. Also, in each of the first mode and the second mode, an instance for content from an information provider may be further provided to at least a portion of the first answer as a second answer. Here, the term "instance" may mean that instances of different structures or contents may be created and provided to users with respect to the same content of the information provider.

The information provider selection system 310 may select, from among the plurality of information providers 340, an information provider to provide an instance for its content as the second answer to the prompt of the user.

Initially, the information provider selection system 310 may perform a stability verification process of verifying whether a natural language-based prompt received from the user is a prompt for providing the content of the information provider and/or whether the content of the information provider may be provided in association with an answer prompt to the prompt of the user (e.g., a first answer created through LLM to the prompt of the user). For example, when the information provider is an advertiser that desires to expose an advertisement of the advertiser, the advertiser may not desire the advertisement to be exposed to a prompt that requests preset illegal information or preset non-advertising information. Also, a type of business or a keyword undesired by the information provider may be included in the answer to the prompt of the user. Therefore, the information provider selection system 310 may initially validate whether the prompt of the user or the answer prompt to the prompt of the user is a prompt that is safe to provide the content of the information provider. Here, the information provider selection system 310 may determine not provide the content of the information provider for a legally problematic prompt, such as a prompt that requests illegal information. Also, the information provider selection system 310 may exclude a corresponding information provider from an information provider selection process for a prompt that does not conform to a policy of the information provider. For example, if the policy of the information provider a prohibits content of the information provider "a" from being provided for a prompt related to specific business type "b" or for a prompt that includes keyword "c," the information provider "a" may be excluded from selection for any prompts related to the corresponding business type "b" or from any prompts that include the keyword "c".

Also, since there may be a plurality of information providers that desire to expose their content, the information provider selection system 310 may select an information provider to provide content from among a plurality of information providers that have passed the above-described verification process. For example, the selection of the information provider may be performed through an auction. The auction method may use any one of a plurality of well-known methods. For example, a generalized second price (GSP) auction method may be used.

Here, the ranking in the auction may be determined through a quality index (QI) and a bid amount (BA).

Here, the quality index (QI) may be determined based on at least one correlation selected from among: 1) a first correlation between the prompt of the user and the content of the information provider, 2) a second correlation between LLM results created based on an LLM for the prompt of the user and the content of the information provider, and 3) a third correlation with an asset of the information provider. For example, the quality index may be computed by a weighted sum of the first correlation, the second correlation, and the third correlation. Here, each of the first correlation, the second correlation, and the third second correlation may be acquired through the LLM. For example, the information provider selection system 310 may create a prompt for requesting correlation between the prompt of the user and the content of the information provider and may input the created prompt into the LLM, and may use correlation presented by the LLM as the first correlation. As another example, the information provider selection system 310 may create a prompt for requesting correlation between the LLM results and the content of the information provider and may input the prompt into the LLM, and may use the correlation presented by the LLM as the second correlation. In this case, the LLM may be trained to compute the correlation depending on the degree of overlapping between two types of data and a topic matching status and/or to compute the correlation by analyzing a sentence structure, vocabulary, and a relationship between sentences using natural language processing technology. Meanwhile, the third correlation may represent a correlation between at least one of the prompt of the user, the LLM results, and a recommendation query created by the LLM and an analysis dimension (e.g., content format, contents, style, and tone and manner) derived from the asset of the information provider (e.g., advertising material of advertiser). For example, the recommendation query may include recommendation prompts that the LLM-based artificial intelligence module 360 can be used as input to the LLM. This third correlation may be measured and computed by inputting relevant data into the LLM. For example, the LLM may compute relatively higher third correlation as each analysis dimension is predicted to have better performance (e.g., advertising performance) for a specific type of user prompt.

Additionally, the third correlation may be computed by collectively reflecting analysis details based on an LLM advertising index and the user's demographics/things of interest information. Here, the LLM advertising index may be acquired according to the advertising performance between the existing query and the existing advertisement. For example, in the case of displaying an advertisement in response to a query "Recommend sneakers," if the performance of the existing advertisement displaying a "large size image with emphasis on sneakers" was good, a relatively high relevance score may be acquired when a material containing the corresponding analysis dimension is registered. The material may include the advertising materials as assets. Also, as an example of using the user's demographics/things of interest information, in the case of displaying an advertisement in response to a query of the user having an interest in fashion, if the LLM determines that "video content with fast screen transition and exposure of a person" has good performance, a relatively high relevance score may be acquired when material containing the corresponding analysis dimension is registered.

Also, the bid amount may be entered from each of the information providers. Here, the information provider selection system 310 may select an information provider for providing content to the prompt of the user through an auction based on the quality index and the bid amount for each information provider.

When the information provider is selected, the search system 320 may dynamically create an instance for content of the selected information provider and may provide the same to the user as the second answer. For example, the search system 320 may provide the user with search results that include not only the first answer created using the LLM but also the aforementioned second answer.

Here, in creating the second answer based on artificial intelligence, the search system 320 may dynamically create the artificial intelligence-based second answer using any or all of the following: a prompt of the user, the first answer created using the LLM, an asset registered by the information provider and/or a prompt registered by the information provider, instead of merely providing information provided from the information provider as is. Here, the asset may include, for example, a uniform resource locator (URL) related to content that the information provider desires to provide, a title or an identifier of the content, a category of the content, multimedia related to the content, contents of the content, and contents of an article related to the content. Here, the multimedia related to the content may include an image and a video related to the content. For example, when the information provider is an advertiser that desires to advertise a specific product or service, the asset may include a URL related to the product or the service, a product name or a service name, a category of the product or the service, product information or service information, and contents of an article related to the product or the service. Also, the prompt registered by the information provider may include information on a phrase or a keyword to emphasize in relation to the content that the information provider desires to provide and a tone or a format of an information message to be provided as the second answer. As such, the search system 320 may provide the user with search results that include the second answer dynamically created by considering the registered asset and associated prompt of the information provider desiring to provide his or her information, and the first answer, as well as the first answer created using the LLM for a natural language prompt of the user.

Also, in certain example embodiments, the search system 320 may create the second answer by further using information about the user. Here, information about the user may include the user's demographic information, things of interest, and purchase information, and such information may be used to customize the second answer to the specific user.

As described above, when the search system 320 provides an answer to a natural language-based prompt from the user, the information provider selection system 310 may select a specific information provider from among the plurality of information providers 340, and the search system 320 may dynamically create an artificial intelligence-based second answer to which an answer dynamically created based on the prompt and the asset of the selected information provider, that is, a message of the information provider is projected. Therefore, the search system 320 may provide the user with the answer dynamically created such that the message of the information provider is projected in relation to the natural language-based prompt received from the user.

Also, in certain example embodiments, the contents of the prompt of the user may be insufficient to match with information of a specific information provider. In this case, the search system 320 may provide the user with a question for inducing the user to provide sufficient information for the above matching to be included in the prompt of the user. This question may also be created through the LLM, and information acquired as the answer of the user to the question may also be included in the prompt of the user.

Figure 4:
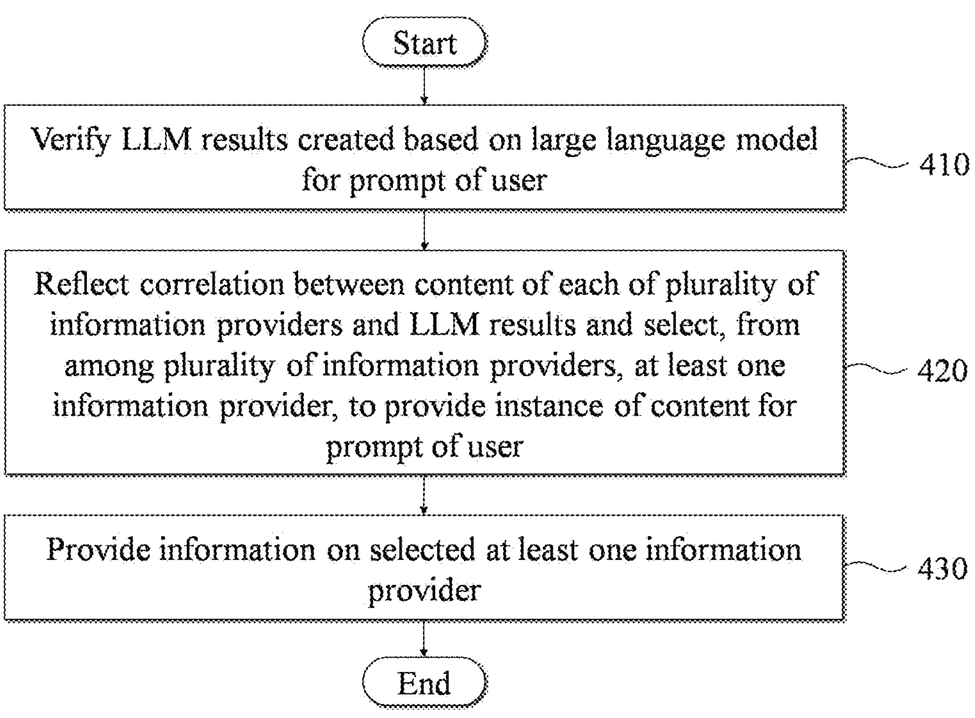
FIG. 4 is a flowchart illustrating an example of an information provider selection method according to at least one example embodiment of the present invention.

FIG. 4 is a flowchart illustrating an example of an information provider selection method according to at least one example embodiment. The information provider selection method according to the example embodiment may be performed by the computer device 200 that implements the aforementioned information provider selection system 310. Here, the processor 220 of the computer device 200 may be implemented to execute a control instruction according to a code of at least one computer program or a code of an OS included in the memory 210. Here, the processor 220 may control the computer device 200 to perform operations 410 to 430 included in the method of FIG. 4.

In operation 410, the computer device 200 may verify LLM results created based on a large language model (LLM) for a prompt of a user. Here, the prompt of the user may include a query of the user input through a search service provided from the search system 320, but it is not limited thereto. For example, the search system 320 may provide a conversation function between artificial intelligence (an artificial intelligence module or AI module) and the user, and information input from the user through the conversation function may be used as the prompt of the user. In this case, the LLM results created by the search system 320 using the LLM as a response to information input from the user may be verified by the computer device 200 in operation 410. This conversation function may be implemented in a single sub-service form that is included in the search service, or it may be implemented in a form linked to the search service as a service that is separate from the search service.

In operation 420, the computer device 200 may reflect correlation between content of each of a plurality of information providers and LLM results and may select, from among the plurality of information providers, at least one information provider to provide an instance of content for the prompt of the user. Here, the aforementioned correlation may correspond to the second correlation described above with 1) to 3). In certain example embodiments, the computer device 200 may select the information provider by further reflecting at least one of the first correlation between the prompt of the user and the content of the information provider and the third correlation with the asset of the information provider.

As described above, the computer device 200 may select at least one information provider from among the plurality of information providers through an auction using a quality index that is determined based on at least one of the first correlation, the second correlation, and the third correlation and a bid amount of each of the plurality of information providers. Here, the computer device 200 may include only information providers that have passed the aforementioned stability verification process in the auction.

In operation 430, the computer device 200 may provide information on the selected at least one information provider. For example, the computer device 200 may deliver an identifier of the selected information provider to the search system 320. In this case, the search system 320 may create a second answer to the prompt of the user, using an asset and a prompt of the selected information provider, the prompt of the user, and the LLM results, and may provide a first answer including the LLM results and search results including the second answer to the user.

FIG. 5 illustrates an example of a dynamically produced advertising instance according to at least one example embodiment. FIG. 5 shows an example of an advertising instance 540 that is created by considering all of the following: an asset 510 for advertising, LLM results 520 created through an LLM for a prompt of a user, and a prompt 530 of an advertiser. In FIG. 5, "AAA" represents a product name of the advertiser and "BBB" represents a brand name of the advertiser. Also, in the prompt 530, "ad" represents advertisement, "SEO" represents search engine optimization, and "organic" represents the LLM results 520. As such, the information provider selection system 310 creates the advertising instance 540 based on the LLM by considering all of the LLM results 520 created through the LLM for the prompt of the user and the asset 510 and the prompt 530 that are registered by the advertiser as the information provider. As a detailed example, the information provider selection system 310 creates the advertising instance 540 by extracting a plurality of prompts for the LLM from each of the LLM results 520, the asset 510, and the prompt 530, and by inputting the extracted prompts to the LLM.

In the example embodiment of FIG. 5, the asset 510 includes only text and an example in which the advertising instance 540 is created based on the text is described. However, in the case of using a set of assets including various multimedia, such as images and videos, the information provider selection system 310 may provide more various types of advertising instances, including images and videos.

Figure 6:
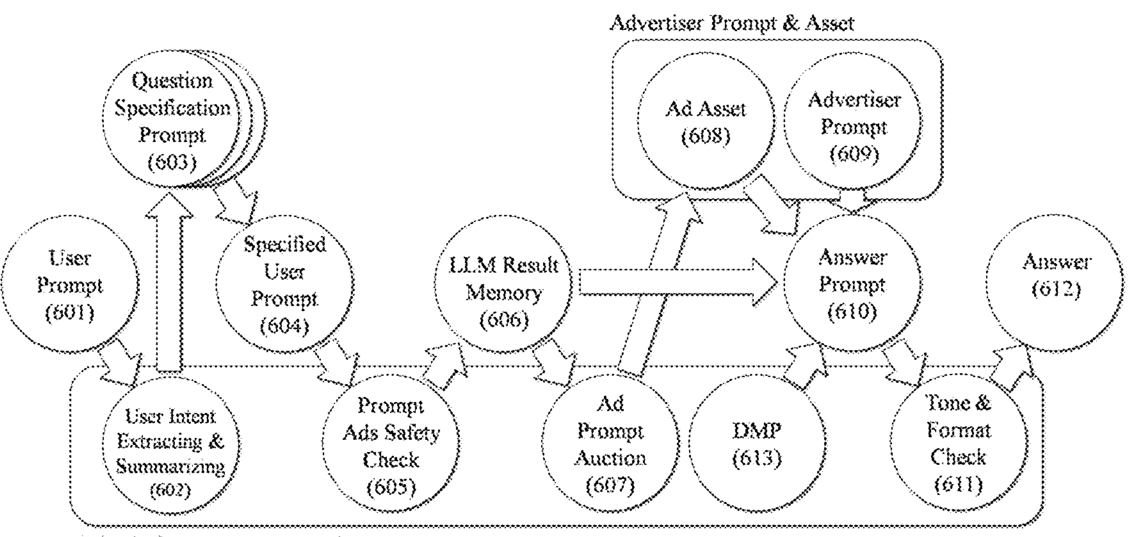
FIG. 6 illustrates an example of describing a process of providing an answer to a prompt of a user according to at least one example embodiment of the present invention.

FIG. 6 illustrates an example of describing a process of providing an answer to a prompt from a user according to at least one example embodiment. The example embodiment of FIG. 6 shows an example of a case in which information providers desire to expose advertising for products or services of advertisers as information they desire to provide.

The search system 320 may receive a user prompt 601 from a terminal of a user connected through the network 170. For example, a prompt may correspond to a natural language-based search term entered by the user. The user may enter a search term through a user interface of a search service provided through the terminal of the user, and the search system 320 may receive the search term entered through the user interface as the user prompt 601.

Here, the search system 320 may extract a prompt to be actually used by analyzing the user prompt 601 and by extracting and summarizing user intent through a process of user intent extracting & summarizing 602.

The search system 320 may induce the user to provide sufficient information for providing an answer in which a marketing message of an advertiser is reflected. For example, the contents of the user prompt 601 may be insufficient to match with a marketing message of a specific advertiser. In this case, the search system 320 may create a question for inducing additional information for selection of the specific advertiser and the question created through the search system 320 may be provided to the user. Then, when a user's answer to the question is received, the prompt may be supplemented using contents of the received answer. A question specification prompt 603 may include the prompt acquired through the answer of the user.

Here, the search system 320 may select a specified user prompt 604 as a prompt for providing the marketing message. That is, the specified user prompt 604 may be specified based on the prompt acquired through the user intent extracting & summarizing 602 for the user prompt 601 and the question specification prompt 603.

A prompt ads safety check 605 may be an example of a process of verifying whether the specified user prompt 604 is a prompt that may expose the marketing message of the advertiser to the user. For example, the search system 320 may perform creation of an answer when the specified user prompt 604 is not a prompt that requests preset illegal information or preset non-advertising information.

Also, the search system 320 may create LLM results by inputting the specified user prompt 604 into an LLM. FIG. 6 shows an example of an LLM result memory 606 that stores the LLM results.

The search system 320 may primarily select advertisers related to the LLM results based on the LLM results stored in the LLM result memory 606. Here, the advertisers related to the LLM results may be advertisers that register marketing messages exposable along with the LLM results. The market messages exposable along with the LLM results may be selected based on relevance between information registered by the advertisers and the LLM results. Also, in certain example embodiments, the search system 320 may use at least one of the specified user prompt 604, the LLM results, and a recommendation query created by the LLM when primarily selecting the advertisers. In this case, the information provider selection system 310 may primarily select the advertisers based on relevance between at least one of the specified user prompt 604, the LLM results, and the recommendation query and information registered by at least one advertiser. Here, the information provider selection system 310 may select a specific advertiser from among the primarily selected advertisers through an ad prompt auction 607.

When the advertiser is selected, the search system 320 may acquire an ad asset 608 registered by the selected advertiser and an advertiser prompt 609 registered by the selected advertiser. In this case, the search system 320 may create an answer prompt 610 to which the marketing message of the advertiser is reflected using at least one of the user prompt 601 and the LLM results stored in the LLM result memory 606 and at least one of the ad asset 608 and the advertiser prompt 609. In certain example embodiments, the advertiser may desire to provide an answer in a specific format according to the characteristics of the user. To this end, the search system 320 may create the answer prompt 610 by further reflecting information on the user. For example, information on the user may include at least one of the user's demographic information, things of interest, and purchase information. For example, the search system 320 may analyze the advertiser prompt 609 and may verify that the advertiser desires to provide a more detailed answer to a female user than to a male user. In this case, the search system 320 may identify a gender of the user through the user's demo and may create the answer prompt 610 in consideration of the identified gender of the user.

Once the answer prompt 610 is created, the search system 320 may verify whether the created answer prompt 610 is suitable for the tone and/or the format that has been verified through the advertiser prompt 609, that is, the system may perform tone & format check 611. If the created answer prompt 610 does not match the tone and/or the format desired by the advertiser, the answer prompt 610 may be further processed to be suitable for the tone and/or the format desired by the advertiser. Also, in certain example embodiments, the search system 320 may additionally verify whether the created answer prompt 610 is safe to be exposed to the particular user.

Then, the search system 320 may provide a finally created answer 612 to the user through the search system 320. For example, the search system 320 may add the answer 612 to the search results and may provide the same to the user through the search service. Also, in certain example embodiments, user information (e.g., gender, age, things of interest, etc.) stored in a data management platform (DMP) 613 may be further used to create the answer prompt 610. By using this user information, the search system 320 may create the answer 612 optimized for the user.

To efficiently utilize the DMP 613, the advertiser prompt 609 may further include information on a characteristic and a weight of a target. For example, the characteristic of the target may include demographics information (gender, age (or age range)), things of interest, and/or purchase information). For example, the weight may include a characteristic-specific weight of the target and/or contents-specific weight of the characteristic. For example, the characteristic-specific weight may indicate how much weight is to be assigned to which characteristic among the target's gender, age, and things of interest. For example, a configuration may be made to assign a weight of 5 if the gender is female, to assign a weight of 3 if the age is in the 20s, and to assign a weight of 8 if the thing of interest is exercise. Also, the contents-specific weight may indicate how much weight is to be assigned which contents from among the contents of the same characteristic. For example, if things of interest set by the advertiser are exercise, fashion, and games, the advertiser may assign a weight of 8 to exercise, a weight of 6 to fashion, and a weight of 2 to games through the advertiser prompt 609. In this case, the search system 320 may create the answer prompt 610 by further using information on the characteristic and weight of the target desired by the advertiser, included in the advertiser prompt 609. Information on such characteristic and weight of the target may be optionally used when information on the characteristic and the weight of the target is available in the LLM.

FIG. 7 illustrates an example of providing search results according to at least one example embodiment of the present invention. FIG. 7 shows an example of a screen of a search page 700 provided to a user through a search service. The search page 700 may include a user interface 710 for receiving a prompt from the user as an input. Also, the search page 700 may include a search result area 720 for displaying search results. Here, the search result area 720 may include an LLM result area 730 for displaying the LLM results created based on a large language model (LLM) from the prompt of the user.

Also, the search result area 720 shows an example of an answer area 740 for displaying an answer created by the search system 320 from the prompt of the user. The example embodiment represents an example in which a plurality of answers are displayed through the answer area 740. As such, the plurality of answers may be created and displayed for a single prompt. Also, answers for each of two or more information providers may be created and displayed. To this end, the information provider selection system 310 may select two or more information providers.

The example embodiment of FIG. 7 shows an example in which an answer of the information provider selected based on the prompt of the user entered into the user interface 710 and/or LLM results displayed in the LLM result area 730 is displayed through an extended area 750. For example, the answer of the information provider selected based on at least one of the prompt of the user, the LLM results, and a recommendation query created by an LLM may be further displayed in the extended area 750. If the information provider is an advertiser, an ad of the advertiser selected based on the prompt of the user, the LLM results, and the recommendation query created by the LLM may be further displayed in the extended area 750.

Also, questions as prompts for requesting an additional prompt from the user in relation to the answer displayed in the extended area 750 may be displayed in a box 760 (indicated with dotted lines). When the user selects a specific question, the corresponding question is recognized as the additional prompt of the user. In the case of providing a conversational search service, the additional prompt of the user may be recognized as a subsequent conversation of the user. In this case, the search system 320 may create LLM results and/or answer in consideration of the entire conversation with the user.

Also, although the example embodiment of FIG. 7 describes an example of receiving the prompt of the user as input through the user interface 710 of the search service and dynamically creating an answer, an interface for creating and providing a dynamic answer may also be included in the search results in certain example embodiments. For example, a function for receiving a prompt of a user through each of and/or some of various vertical services provided in the conventional search ecosystem and dynamically creating and providing an answer may be provided to the user. Here, the vertical service may refer to a service for each of various collections that classify search results, such as a shopping search, a knowledge search, a local search, a user generated contents (UGC) search, a language search, an image search, a video search, and a new search. For example, in the case of separately providing a shopping search service as a vertical service of an integrated search service, a function for receiving a prompt of a user as input and dynamically creating and providing an answer may be provided to the user through the shopping search service. If a plurality of different advertising services are provided as a vertical service of the integrated search service, the function for receiving the prompt of the user as input and dynamically creating and providing the answer may be provided to the user through each of the plurality of advertising services.

Figure 8:
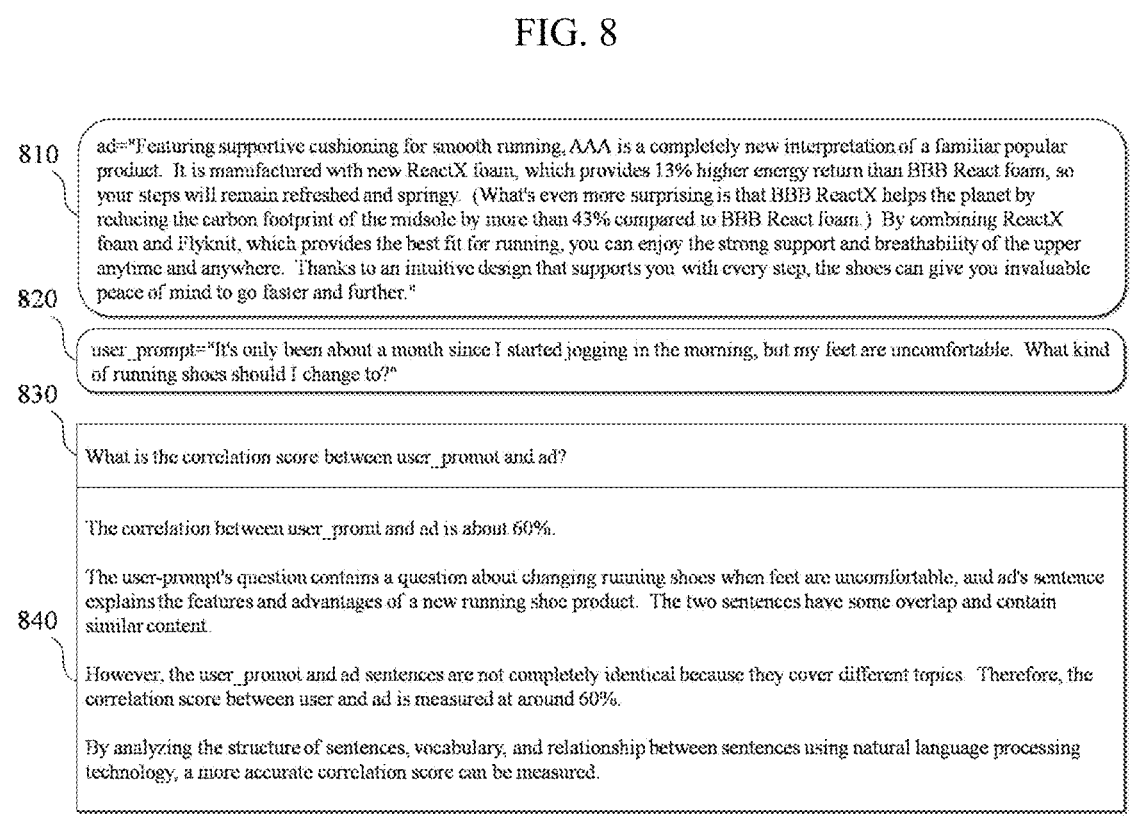

FIG. 8 illustrates an example of computing a first correlation through an LLM according to at least one example embodiment. FIG. 8 shows an example in which the information provider selection system 310 creates a question 830 and inputs the same into the LLM to acquire the first correlation between an advertising sentence 810 and a prompt 820 of a user based on the advertising sentence 810 of an advertiser and the prompt 820 of the user. Here, output 840 of the LLM may include the first correlation (60% in the example embodiment of FIG. 8) between the advertising sentence 810 and the prompt 820 of the user. This example embodiment of FIG. 8 visually displays the output 840 of the LLM to help understanding of the present invention and the output 840 of the LLM does not need to be visually displayed in reality. For example, the information provider selection system 310 may simply extract and use the first correlation from the output 840 of the LLM.

FIG. 9 illustrates an example of computing a second correlation through an LLM according to at least one example embodiment. FIG. 9 shows an example in which the information provider selection system 310 creates a question 930 and inputs the same into the LLM to acquire the second correlation between an advertising sentence 910 of an advertiser and LLM results 920 created based on the LLM for a prompt of a user. Here, output 940 of the LLM may include the second correlation (40% in the example embodiment of FIG. 9) between the advertising sentence 910 and the LLM results 920. The example embodiment of FIG. 9 visually displays the output 940 of the LLM to help understanding of the present invention and the output 940 of the LLM does not need to be visually displayed in reality. For example, the information provider selection system 310 may simply extract and use the second correlation from the output 940 of the LLM.

FIGS. 10 to 14 illustrate examples of a chat mode that provides an answer as LLM results through conversation between an LLM-based artificial intelligence module 35 and a user according to at least one example embodiment. This chat mode may correspond to the aforementioned second mode.

Figure 10:
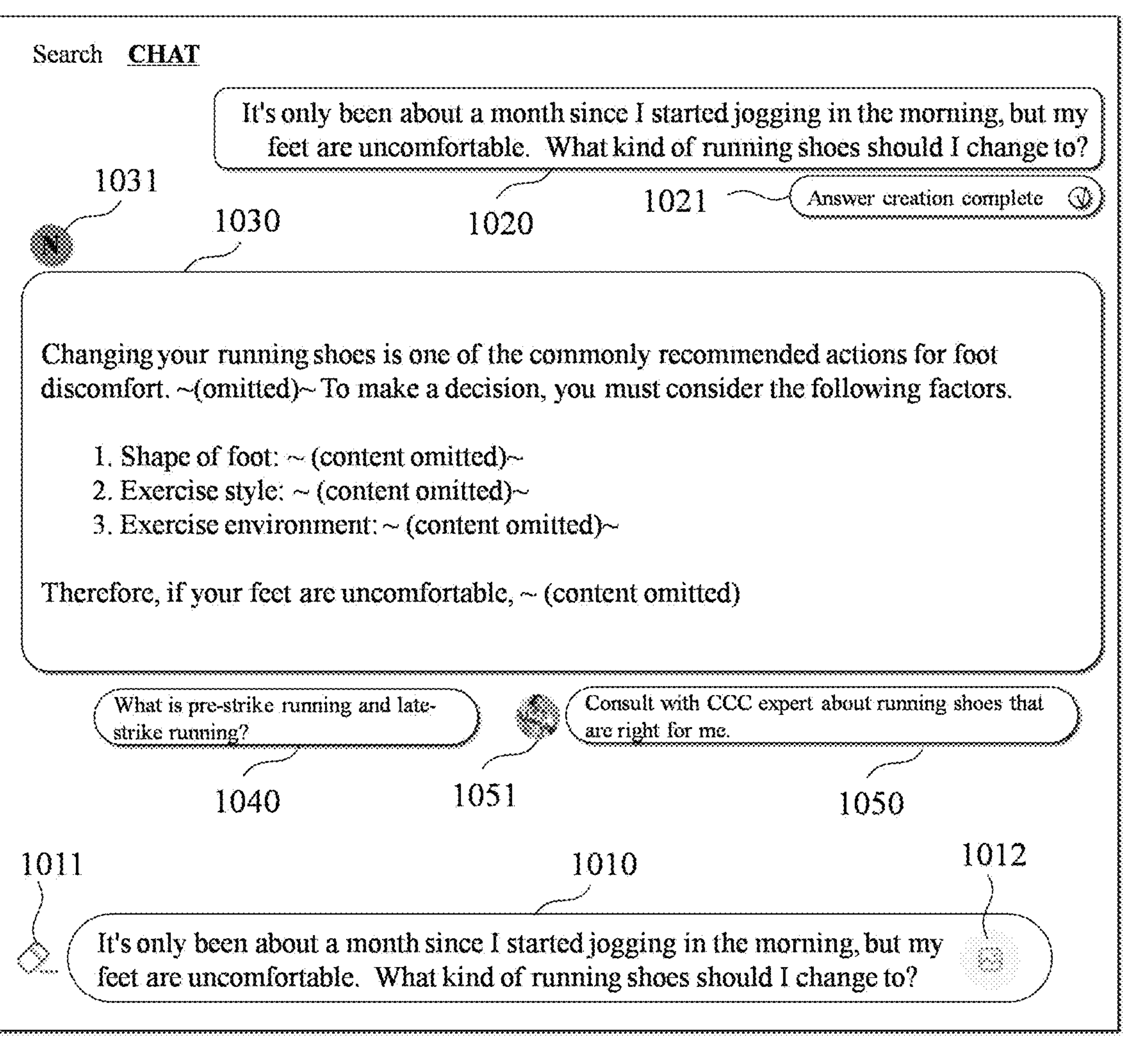
FIGS. 10 to 14 illustrate examples of a chat mode that provides an answer as LLM results through conversation between LLM-based artificial intelligence module and a user according to at least one example embodiment of the invention.

The example embodiment of FIG. 10 shows an input interface 1010 for receiving a prompt from a user as input. The input interface 1010 may be linked to a virtual keyboard function that allows the user to enter text and/or a function for delivering the text input through the input interface 1010 to the search system 320. Also, a session initialization interface 1011 for initializing a current conversation session may be provided. The session initialization interface 1011 may be linked to a function for requesting the search system 320 to initialize the current conversation session to start a new conversation session. Although the example embodiment of FIG. 10 shows an example in which the session initialization interface 1011 in the shape of a specific icon is provided on the left of the input interface 1010, a shape or a type (icon, button, link, etc.), a position, etc., of the session initialization interface 1011 may be variously configured depending on example embodiments. Also, a multimedia input interface 1012 for receiving multimedia, such as an image and a video, in addition to the text, as the prompt of the user may be provided. The multimedia input interface 1012 may be linked to a function for selecting and delivering multimedia data stored in a terminal of the user or to deliver multimedia data created through a camera included in the terminal of the user.

The example embodiment of FIG. 10 shows a first area 1020 in which the prompt of the user delivered to the search system 320 through the input interface 1010 is displayed in the form of a message for conversation. Also, in association with the first area 1020, a second area 1021 for displaying a process of creating an answer to the prompt of the user is present. The process of creating the answer may include, for example, a "search" process, a "search results analysis" process, a process of "reviewing whether further search is required," and an "answer creation complete" process, but it is not limited thereto. In the example embodiment of FIG. 10, the second area 1021 shows the "answer creation complete" process. Also, the example embodiment shows a third area 1030 on which the answer created for the prompt of the user is displayed. Here, an icon 1031 representing an entity that provides the answer may be displayed in association with the third area 1030. For example, the icon 1031 may include information available to identify the search system 320.

Also, the search system 320 may further provide a first recommendation prompt 1040 to the user. In this case, the first recommendation prompt 1040 may be used as a prompt of the user in such a simple manner that the user selects the first recommendation prompt 1040, and the user may continue the next conversation with the artificial intelligence in a current conversation session. Also, the search system 320 may further provide a second recommendation prompt 1050 to the user for conversation with a specific information provider. Here, an icon 1051 for displaying the corresponding information provider in association with the second recommendation prompt 1050 may be displayed in association with the second recommendation prompt 1050. For example, the icon 1051 may include information, such as an image, text, etc., related to the information provider.

Figure 11:
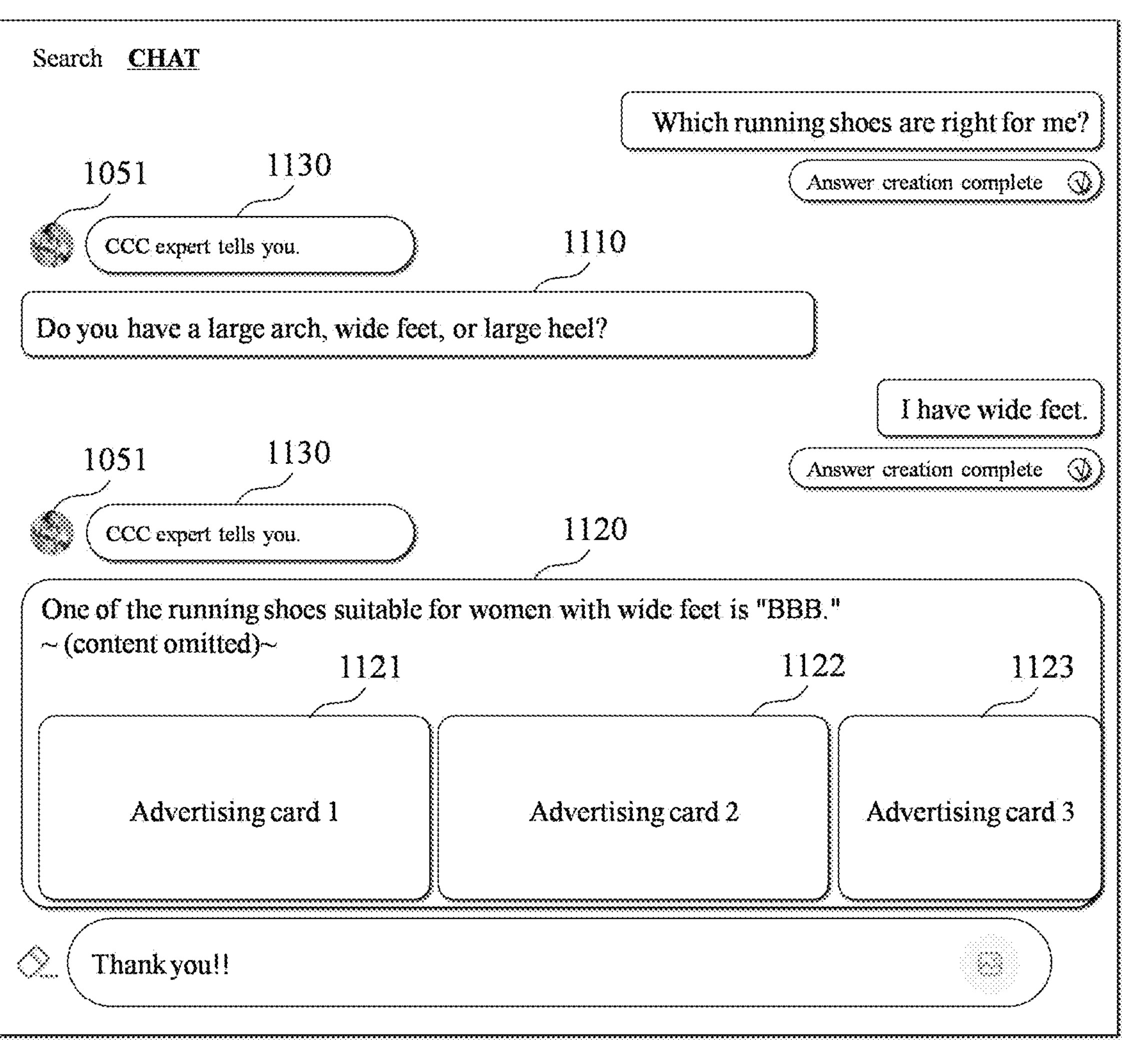

The example embodiment of FIG. 11 shows an example in which, in response to the second recommendation prompt 1050 being selected by the user in FIG. 10, conversation with the user proceeds through artificial intelligence specialized for the specific information provider. Here, the artificial intelligence specialized for the specific information provider may also be artificial intelligence provided by the search system 320 based on the LLM. In certain example embodiments, consideration of whether the artificial intelligence specialized for the specific information provider is registered to the search system 320 by the specific information provider or is provided by the specific information provider. Here, information 1130 notifying that a corresponding answer 1110, 1120 is provided by the specific information provider may be displayed in the answer 1110, 1120 provided from the artificial intelligence specialized for the specific information provider, and the icon 1051 for the corresponding information provider may be further displayed. As described above, the answers 1110 and 1120 may be dynamically created answers that reflect information (e.g., asset, prompt, etc.) registered in association with the corresponding information provider. Advertising cards (advertising card 1 1121, advertising card 2 1122, and advertising card 3 1123) included in the answer 1120 may be produced in a form that includes each product image and product description (product identifier, price, etc.).

Figure 12:
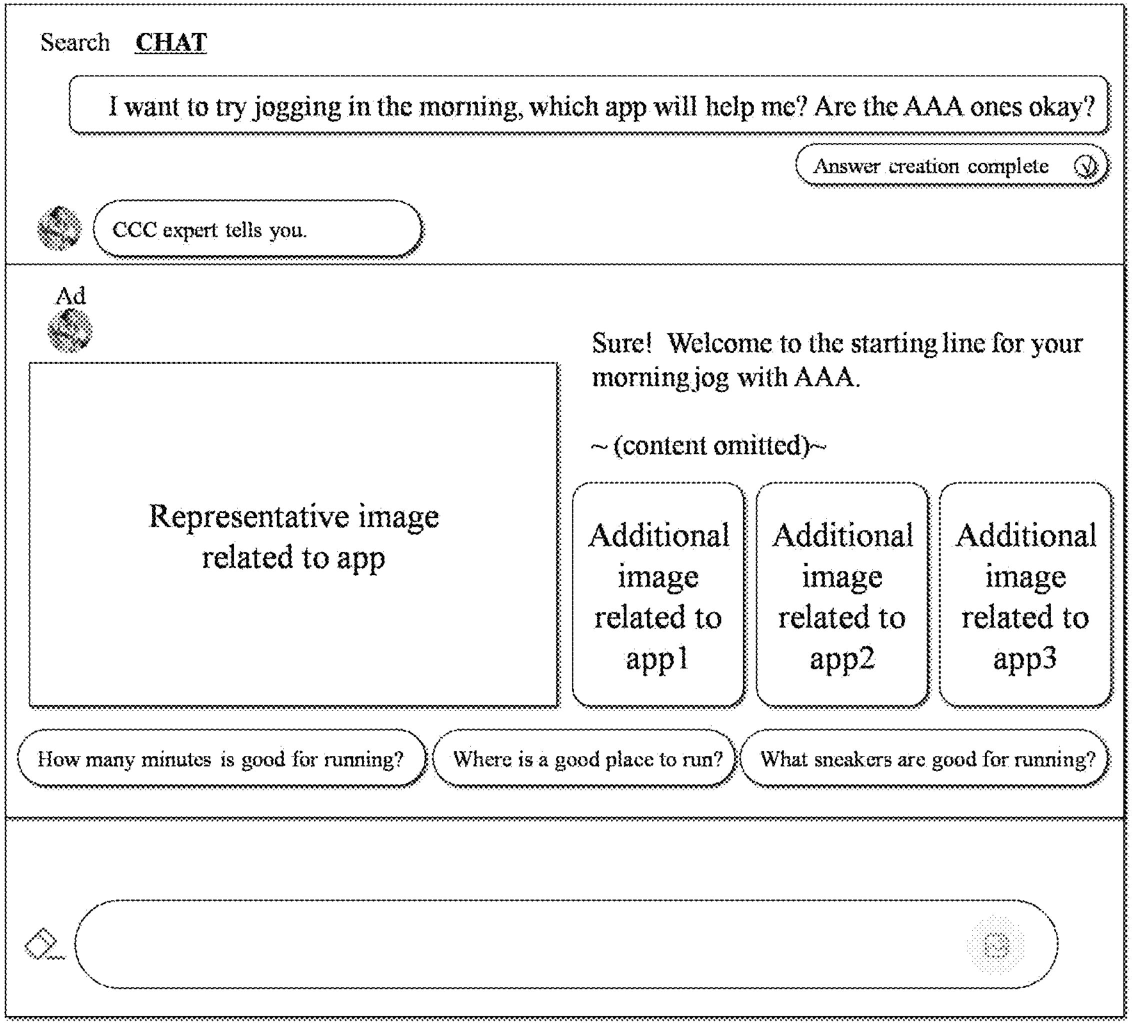

The example embodiment of FIG. 12 shows an example of providing an answer dynamically created for an app advertisement of a specific information provider in response to a prompt of a user for app recommendation. Here, the example embodiment of FIG. 12 shows an example of dynamically creating and providing an answer of specific brand content in a generative search experience (SGE) style.

Figure 13:
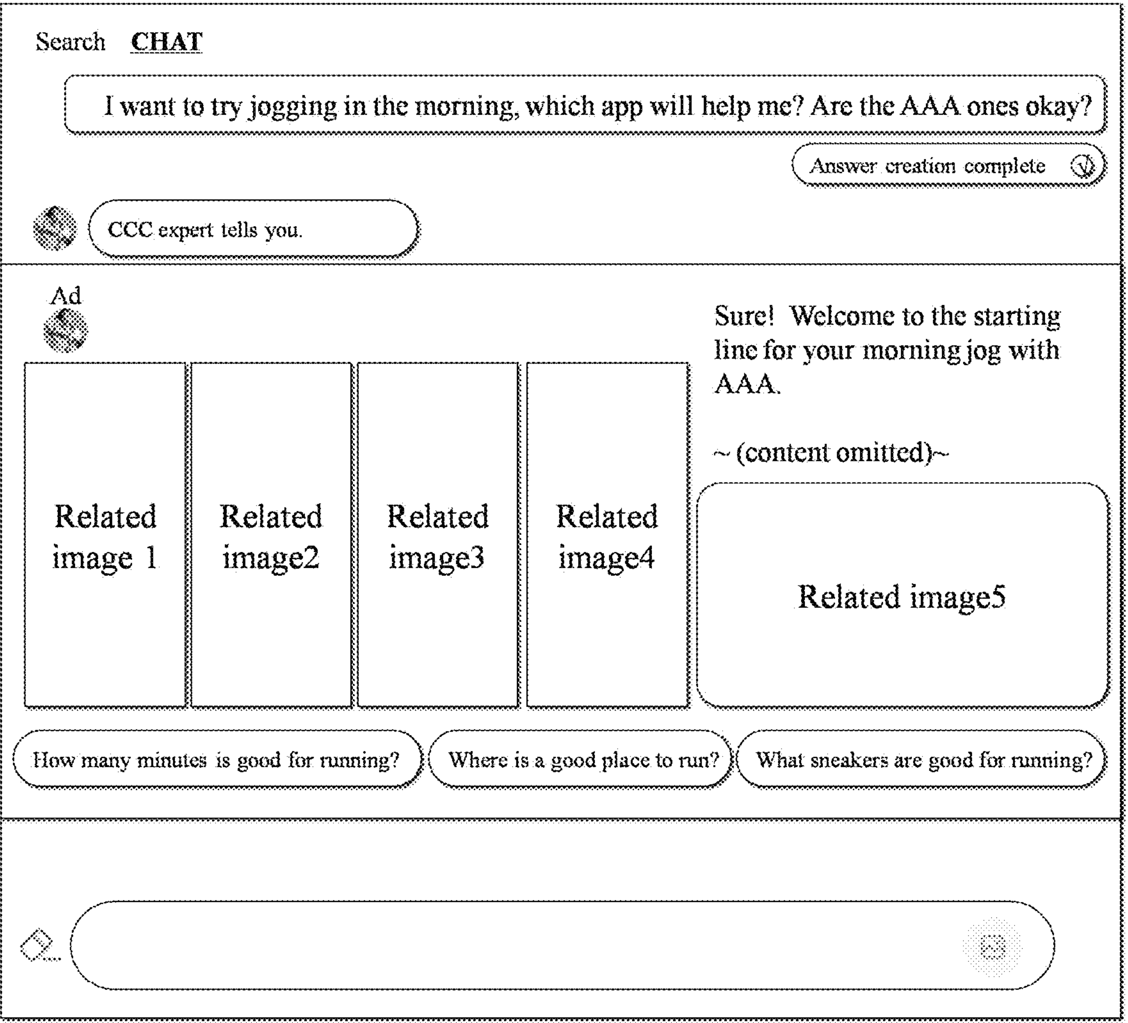

The example embodiment of FIG. 13 shows an example of dynamically creating and providing an answer of an information provider in a different format of a generative search experience (SGE) style to a prompt of the same user as in FIG. 12. As such, the answer of the information provider may be dynamically created and provided in various formats and contents to the prompt.

Figure 14:
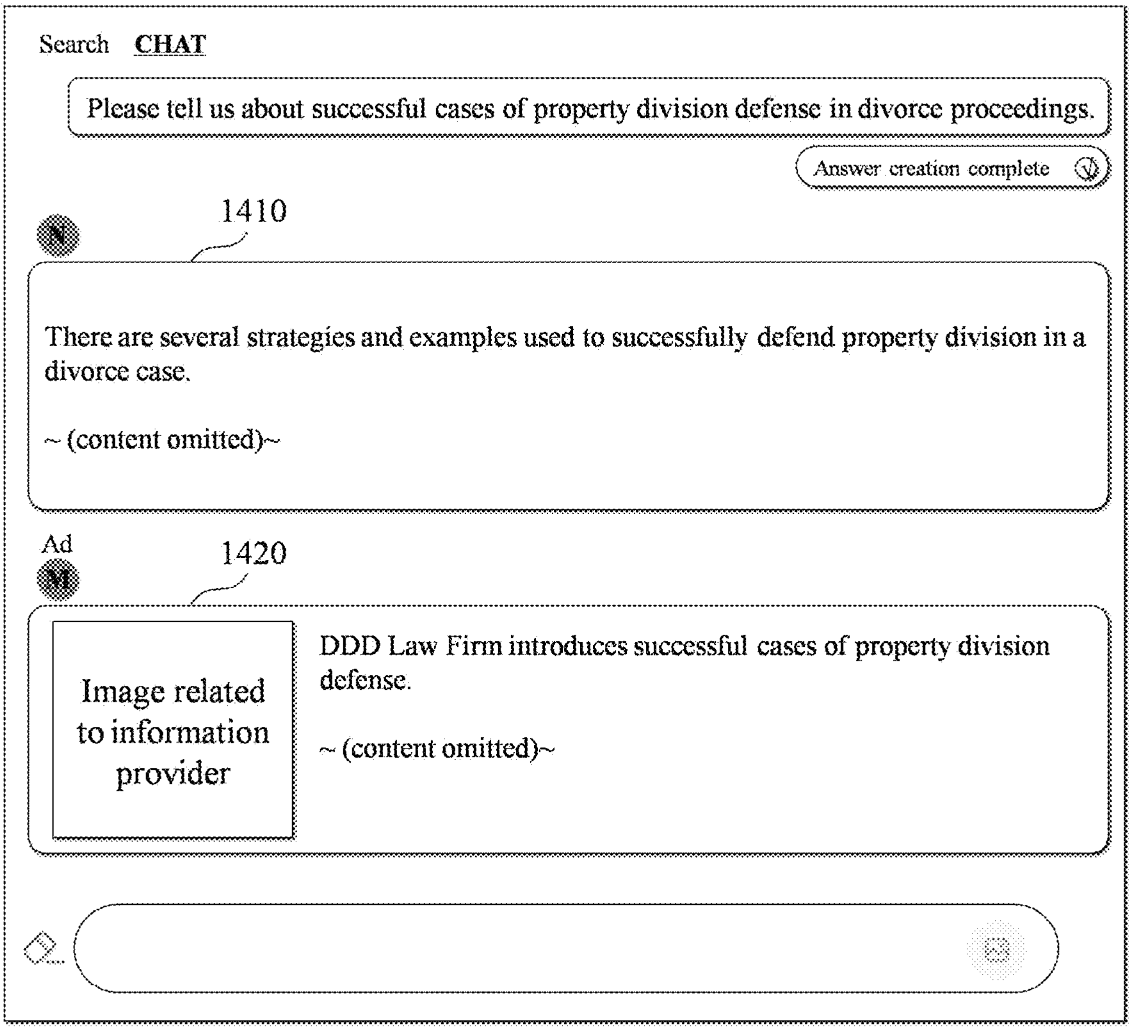

The example embodiment of FIG. 14 shows an example of providing an answer of an information provider during conversation with artificial intelligence (AI module) as if it were another user in a group chatroom. That is, as an answer 1420 of the information provider is provided in a conversation form separate from an answer 1410 of the artificial intelligence (AI module), a user may have the same type of experience as if the user converses with two or more other users in a group chatroom.

As described above, according to example embodiments, there may be provided a method and system for selecting an information provider to a user query.

The systems or apparatuses described herein may be implemented using hardware components, or a combination of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, or a computer storage medium or device to provide instructions or data to or to be interpreted by the processing device. The software also may be distributed over network coupled computer systems so that the software is stored and executed in a distributed fashion. The software and data may be stored by one or more computer readable storage mediums.

The methods according to the example embodiments may be implemented in the form of program instructions executable through various computer methods and recorded in non-transitory computer-readable media. The media may include, alone or in combination with program instructions, data files, and data structures. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of non-transitory computer-readable media include magnetic media such as hard disks, floppy disks, and magnetic tapes; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of a program instruction include an advanced language code executable by a computer using an interpreter as well as a machine language code produced by a compiler.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An information provider selection method of a computer device comprising at least one processor, the information provider selection method comprising:

verifying, by the at least one processor, LLM results created based on a large language model (LLM) from a prompt of a user; and reflecting, by the at least one processor, correlation between content of each of a plurality of information providers and the LLM results and selecting from among the plurality of information providers, at least one information provider to provide an instance of content in response to the prompt of the user; and wherein the instance of content provided in response to the prompt of the user has been dynamically created by the at least one processor using the LLM results, instead of merely providing information from the selected information provider as is, wherein an instance for content of the selected at least one information provider is dynamically created using the LLM results and a pre-registered asset of the selected at least one information provider and provided to the user, and wherein the instance for the content of the selected at least one information provider is dynamically created by further using a pre-registered prompt of the selected at least one information provider.

2. The information provider selection method of claim 1, wherein the selecting of the at least one information provider comprises:

primarily selecting, from among the plurality of information providers, information providers related to at least one of the prompt of the user, the LLM results, and a recommendation query created by the large language model; and dynamically conducting an auction between the primarily selected information providers and then selecting the at least one information provider as a final information provider.

3. The information provider selection method of claim 2, wherein the selecting as the final information provider comprises selecting the at least one information provider through a ranking determined based on a quality index (QI) and a bid amount (BA) of each of the information providers, and the quality index is determined using, at least in part, correlation between content of each of the plurality of information providers and the LLM results.

4. The information provider selection method of claim 1, wherein the selecting of the at least one information provider comprises selecting the at least one information provider by further reflecting correlation between content of each of the plurality of information providers and the prompt of the user.

5. The information provider selection method of claim 1, wherein the selecting of the at least one information provider comprises selecting the at least one information provider by further reflecting correlation between at least one of the prompt of the user, the LLM results, and a recommendation query created by the LLM and an analysis dimension derived from an asset of each of the plurality of information providers.

6. The information provider selection method of claim 5, wherein the analysis dimension includes at least one of a content format, contents, a style, and a tone and manner.

7. The information provider selection method of claim 5, wherein the asset includes at least one of a uniform resource locator (URL) related to content that a corresponding information provider desires to provide, a title of the content, an identifier of the content, a category of the content, multimedia related to the content, contents of the content, and contents of an article related to the content.

8. The information provider selection method of claim 1, wherein the instance for the content of the selected at least one information provider is dynamically created by further using at least one of the prompt of the user and information on the user.

9. The information provider selection method of claim 8, wherein the pre-registered prompt includes at least one of a phrase or a keyword entered by the selected at least one information provider to emphasize in relation to the content that the selected at least one information provider desires to provide and a tone or a format of an information message to be provided through the instance for the content.

10. A non-transitory computer-readable recording medium storing a computer program to execute the method of claim 1 on the computer device.

11. A computer device comprising:

at least one processor configured to execute instructions readable on the computer device, wherein the at least one processor is configured to:

verify LLM results created based on a large language model (LLM) from a prompt of a user, and reflect correlation between content of each of a plurality of information providers and the LLM results and select from among the plurality of information providers, at least one information provider to provide an instance of content for the prompt of the user; and wherein the instance of content provided in response to the prompt of the user has been dynamically created by the at least one processor using the LLM results, instead of merely providing information from the selected information provider as is, wherein an instance for content of the selected at least one information provider is dynamically created using the LLM results and a pre-registered asset of the selected at least one information provider and provided to the user, and wherein the instance for the content of the selected at least one information provider is dynamically created by further using a pre-registered prompt of the selected at least one information provider.

12. The computer device of claim 11, wherein, to select the at least one information provider, the at least one processor is configured to:

primarily select, from among the plurality of information providers, information providers related to at least one of the prompt of the user, the LLM results, and a recommendation query created by the large language model, and dynamically conduct an auction between the primarily selected information providers and select the at least one information provider as a final information provider.

13. The computer device of claim 12, wherein, to select as the final information provider, the at least one processor is configured to select the at least one information provider through a ranking determined based on a quality index (QI) and a bid amount (BA) of each of the information providers, and the quality index is determined using at least correlation between content of each of the plurality of information providers and the LLM results.

14. The computer device of claim 11, wherein, to select the at least one information provider, the at least one processor is configured to select the at least one information provider by further reflecting correlation between content of each of the plurality of information providers and the prompt of the user.

15. The computer device of claim 11, wherein, to select the at least one information provider, the at least one processor is configured to select the at least one information provider by further reflecting correlation between at least one of the prompt of the user, the LLM results, and a recommendation query created by the LLM and an analysis dimension derived from an asset of each of the plurality of information providers.

16. The information provider selection method of claim 1, wherein the pre-registered prompt includes at least one of a phrase or a keyword entered by the selected at least one information provider to emphasize in relation to the content that the selected at least one information provider desires to provide and a tone or a format of an information message to be provided through the instance for the content.

17. The computer device of claim 11, wherein the pre-registered prompt includes at least one of a phrase or a keyword entered by the selected at least one information provider to emphasize in relation to the content that the selected at least one information provider desires to provide and a tone or a format of an information message to be provided through the instance for the content.

* * * * *